UNITED STATES PATENT OFFICE.

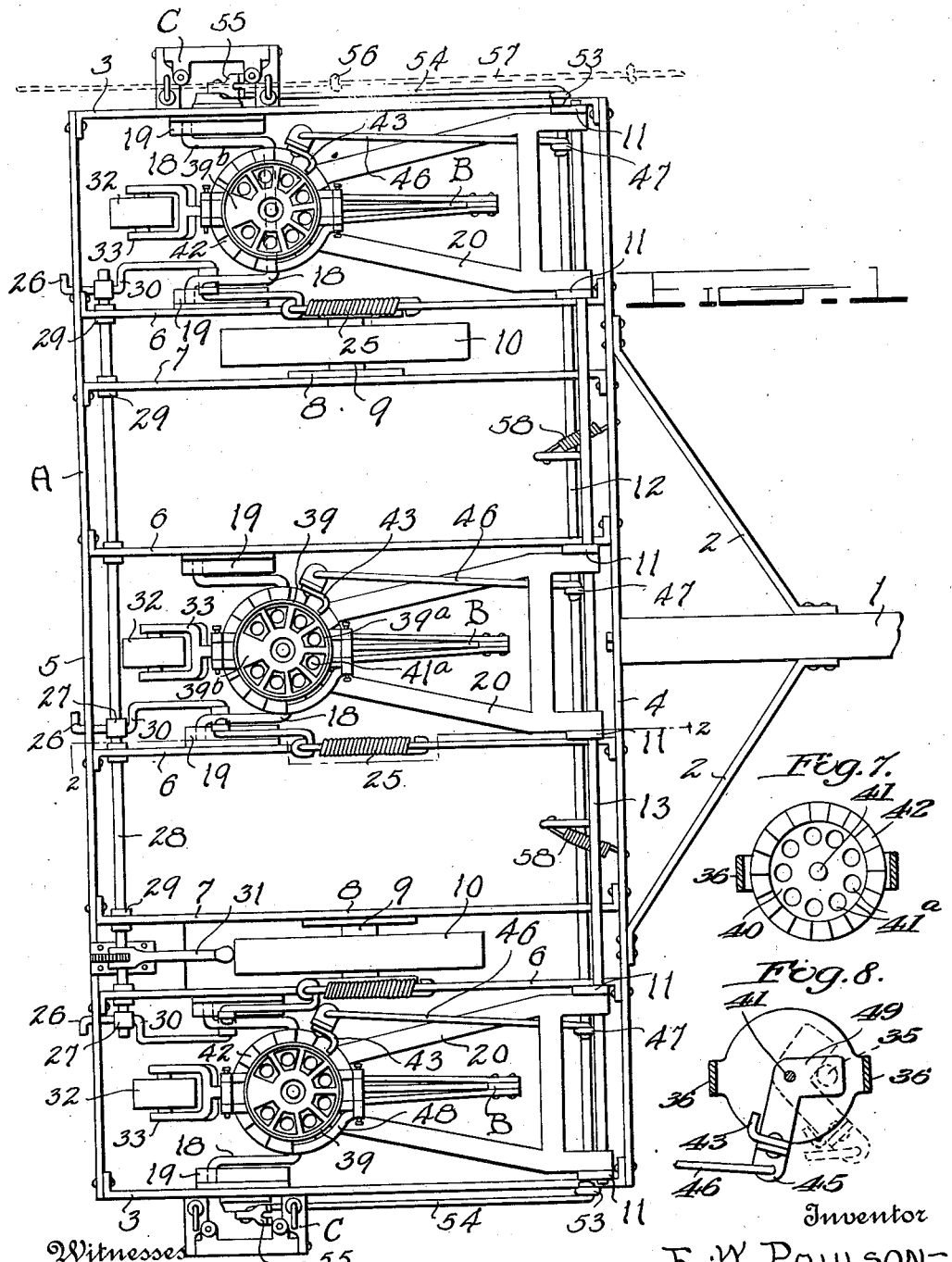

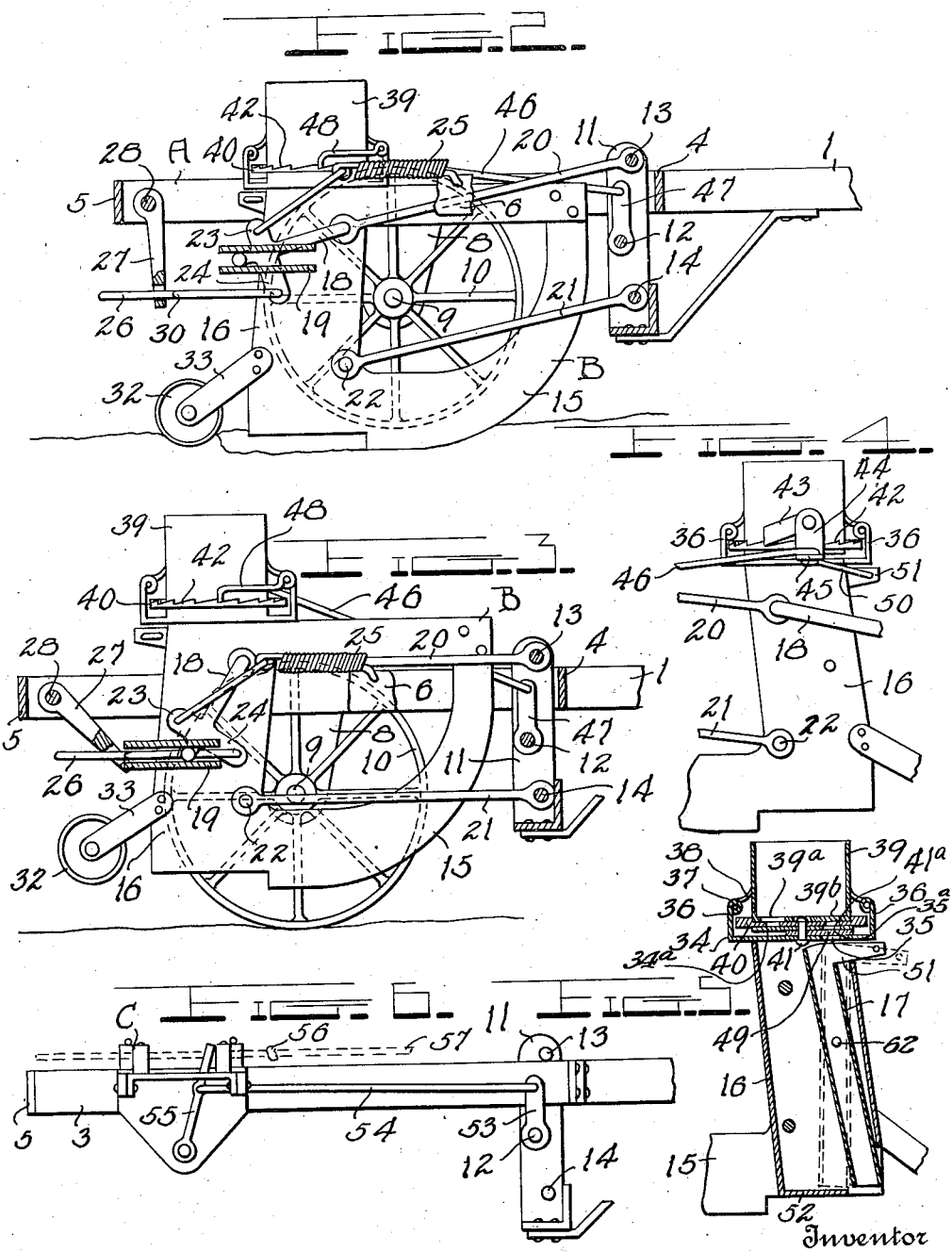

ERNEST W. PAULSON, OF SMITHLAND, IOWA.

THREE-ROW CORN-PLANTER.

1,174,606.    Specification of Letters Patent.    Patented Mar. 7, 1916.

Application filed April 28, 1915. Serial No. 24,525.

*To all whom it may concern:*

Be it known that I, ERNEST W. PAULSON, a citizen of the United States, residing at Smithland, in the county of Woodbury and State of Iowa, have invented certain new and useful Improvements in Three-Row Corn-Planters, of which the following is a specification.

The present invention relates to a multiple row corn planter, and has for its object to provide a device of this character which embodies novel features of construction whereby the several runners and dropping mechanisms can rise and fall independently of each other, thereby enabling the planter to be successfully used on rough and uneven ground.

Further objects of the invention are to provide a corn planter of this character which is comparatively simple and inexpensive in its construction, which can be drawn across the field and operated by a check wire in the usual manner, which is at all times under the perfect control of the operator, and which will drop the corn at the desired intervals and also at the desired depth.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a top plan view of a corn planter constructed in accordance with the invention. Fig. 2 is a vertical sectional view taken on the line 2—2 of Fig. 1, showing the runner in its lowered position. Fig. 3 is a similar view showing the runner in its raised or inoperative position. Fig. 4 is a side elevation of one of the seed dropping mechanisms. Fig. 5 is a vertical sectional view through the same. Fig. 6 is an end elevation of the corn planter showing the check wire engaging lever and its connection to the rock shaft for operating the dropping mechanisms. Fig. 7 is a transverse sectional view taken through the seed dropping mechanism on a plane between the base of the seed hopper and the revolving plate. Fig. 8 is a similar view taken on a plane between the intermediate plate and the top of the operating lever, the shutter being shown in inoperative position by dotted lines.

Corresponding and like parts are referred to in the following description and indicated in all the views of the drawings by the same reference characters.

For the purpose of illustration the planter is illustrated as provided with three runners and dropping mechanisms so that three rows of corn can be planted at the same time, although it will be obvious that the same construction could be utilized for a multiple row corn planter having any desired number of the runners mounted thereon.

The reference character A designates the main frame which is substantially rectangular in formation and is mounted to travel in a direction parallel to its minor axis. Projecting from the front of the main frame is a tongue 1 to which the draft animals can be connected, suitable diagonal braces 2 being provided at the base of the tongue to obtain a rigid connection between the tongue and the main frame.

The main frame A includes the end bars 3 which are connected by the front longitudinal bar 4 and the rear longitudinal bar 5. A series of parallel cross bars 6 connect the front bar 4 and rear bar 5 of the main frame, two of the said cross bars being properly spaced from the opposite end bars 3 of the main frame so as to coöperate therewith to provide supports for the two end runners B, while a pair of the cross bars 6 are arranged at the middle of the main frame and provide a support for the middle runner B. Additional cross bars 7 have a parallel and slightly spaced relation to the end cross bars 6, both the end cross bars 6 and the cross bars 7 being provided with suitable bearings 8 within which the axles 9 of the main supporting wheels 10 are journaled.

The front bar of the main frame A is provided with a series of upright strips 11 which are provided with corresponding bearings within which a rock shaft 12 is journaled, said rock shaft being actuated by the check wire and serving in turn to operate the dropping mechanisms of the several runners B. An upper pivot shaft 13 extends through the strips 11 and is arranged above the rock shaft 12, while a lower pivot shaft 14 extends through the lower ends of the upright strips 11 and is arranged below the rock shaft 12.

Each of the runners B includes the usual runner or furrow opening blade 15 which is curved upwardly at the forward end thereof, the rear end of the furrow opener being connected to a shank or standard 16 which has a hollow or tubular formation so as to provide a housing within which the oscillating seed tube or chute 17 is mounted. The shanks or standards 16 are provided with suitable bearings to receive the crank portions of independent crank shafts 18, the extremities of the crank shafts being slidably received within horizontal guides 19 which are applied to the end bars 3 and cross bars 6 of the main frame. The crank portions of the said crank shafts 18 are pivotally connected to the rear ends of an upper set of swinging frames 20 which have the forward ends thereof pivotally connected to the upper rod or shaft 13 which extends transversely across the front of the main frame. Arranged under the upper swinging frames 20 are corresponding lower swinging frames 21 which have a spaced and parallel relation to the corresponding upper frame members 20, the forward ends of the lower frame members 21 being pivotally connected to the lower shaft or rod 14, while the rear ends thereof are pivotally connected to pins 22 extending transversely through the shanks or standards 16 of the respective runners. It will thus be obvious that each of the runners is pivotally connected to the front of the main frame A by means of spaced and parallel swinging frames 20 and 21 so that it can swing freely up and down, but will always maintain the same upright position. The raising and lowering of the runners is accomplished through the medium of the crank shafts 18 which rotate about the bearings in the respective shanks 16 as an axis, the ends of the crank shafts sliding back and forth in the horizontal guides 19 as the crank shafts are rotated. In effect, the ends of the crank shafts constitute crank arms which have a sliding engagement with the guides 19 and coöperate therewith to raise and lower the runners as the shafts are rotated.

Rigid with each of the crank shafts 18 is an upwardly projecting arm 23 and a downwardly projecting arm 24. Forwardly extending springs 25 are suitably connected at their rear ends to the arms 23 and at their forward ends to the main frame A so that the tension of the springs will tend to rotate the crank shafts 18 in such a direction as to lower the runners B and hold them in a yielding engagement with the ground. The downwardly projecting arms 24 of the crank shafts 18 are loosely connected to rearwardly extending links 26 which pass loosely through suitable openings in crank arms 27 which are pendent from and rigid with a transverse shaft 28 arranged at the rear of the main frame A and journaled within suitable bearings 29. Offset portions or shoulders 30 are formed upon the links 26 so that when the shaft 28 is rotated in one direction the crank arms 27 will engage the shoulders 30 so as to coöperate with the links 26 to rock the crank shafts 18 and simultaneously raise all of the runners into an inoperative position. However, when the crank arms 27 of the crank shafts 28 are swung rearwardly away from the shoulders 30 the links 26 will slide freely through the openings of the crank arms so that the runners can rise and fall in the manner necessary to accommodate themselves to inequalities in the surface of the ground without any interference on the parts of the crank shafts. For the purpose of manipulating the transverse shaft 28 when it is desired to lift all of the runners into inoperative position, an operating lever 31 is applied to one end thereof. When this lever is swung rearwardly all of the runners are simultaneously lifted into inoperative position, although when the lever is swung forwardly the runners are free to rise and fall independently of each other and are held in a yielding engagement with the surface of the ground by means of the springs 25.

Each of the runners B is provided at the rear end thereof with a roller 32 which trails behind the same and serves both to gage the depth of the runner and to cover the corn. These rollers are shown as journaled within forks 33 and means may be provided for raising and lowering the rollers with respect to the runners.

At the upper end of each of the shanks or standards 16 is a base plate 34 which is provided with a dropping opening 35 through which the corn falls into the seed chute 17. Projecting upwardly from the front and rear ends of the base plate 34 are brackets 36 which are detachably connected by suitable means such as the pins 37 to arms 38 upon the seed hopper 39. The pins 37 are removable and engage corresponding sleeves at the extremities of the brackets 36 and arms 38 so as to provide a rigid mounting for the seed hopper. The bottom of the seed hopper is provided with the usual peripheral openings 39ª and the imperforate portion 39ᵇ arranged over the dropping opening 35 of the base plate 34. Interposed between the bottom of the seed hopper 39 and an intermediate plate 34ᵃ is a rotary plate 40 which is pivotally connected at 41 to the base plate an intermediate plate 34ᵃ at a point directly under the center of the hopper. The intermediate plate 34ᵃ is provided with an opening 35ᵃ arranged directly over the dropping opening 35 of the base plate 34. This rotary plate 40 is provided with an annular series of seed openings 41ᵃ which travel under the openings 39ᵃ in the bottom of the seed hopper and pass successively across the opening 35ᵃ of the intermediate plate 34ᵃ and the dropping opening 35 of the base plate 34, thereby feeding the corn from the hopper to the upper end of the seed chute 17 in the usual manner.

The periphery of the rotary plate 40 projects laterally from the base of the seed hopper 39 and is provided with a rack or annular series of inclined teeth 42 which are engaged by a pawl 43. This pawl 43 is pivotally mounted upon an arm 44 projecting from an operating lever 45 which passes between the base plate 34 and the intermediate plate 34ᵃ and is pivotally mounted upon the pin 41. The outer end of the operating lever is connected by means of a forwardly extending link 46 to an arm 47 upon the transverse rock shaft 12 at the front of the main frame A. As this rock shaft 12 is operated the lever 45 is swung back and forth, the pawl 43 slipping over the teeth 43 of the seed plate 40 when moving rearwardly and engaging the said teeth to rotate the seed plate when moving forwardly. In this manner an intermittent rotary movement is imparted to the seed plate for feeding the seeds from the hopper in the necessary manner. A detent 48 is provided for preventing retrograde movement of the seed plate 40, said detent being shown as located upon the opposite side of the seed hopper from the pawl 43 and as pivotally mounted upon one of the pins 37. Both the detent 48 and the pawl 43 are arranged so as to drop into operative position by the action of gravity, although springs may be employed if desired.

The operating lever 45 of each of the dropping mechanisms is provided with a shutter 49 which moves back and forth over the dropping opening 35 of the base plate 34 so as to control the same. It will also be observed that each of the operating levers 45 is connected by a link 50 to an arm 51 projecting rearwardly from the upper end of the oscillating seed chute 17, said chute being pivotally mounted at an intermediate point in its length upon the transverse pin 62 and the lower end thereof being swung forwardly and rearwardly so as to be alternately opened and closed. When the lower end of the seed chute 17 is swung forwardly it is closed by the plate 52, while when swung rearwardly it clears the edge of the plate so that any seed within the chute will drop into the furrow. When the operating lever 45 is swung rearwardly the lower end of the seed chute 17 is closed by the plate 52. At the same time, the shutter 49 is swung away from the dropping opening 35 of the base plate 34 and the upper end of the seed chute brought under the dropping opening so that a charge of the seed will be deposited in the seed chute 17 and fall downwardly to the bottom thereof. Upon the forward movement of the operating lever 45 the shutter 49 will swing over the dropping opening 35 so as to positively prevent the deposit of a charge of seed into the seed chute, while the lower end of the seed chute is swung rearwardly away from the plate 52 so that the charge of seed previously dropped into the same will be deposited in the furrow. In this manner an even distribution of the seed in the furrow is assured.

The opposite ends of the transverse rock shaft 12 at the front of the main frame A are provided with crank arms 53 which are connected by rearwardly extending link members 54 to trip levers 55 pivotally mounted upon the ends of the main frame and adapted to be actuated by engagement with the knots 56 of a check wire 57. Suitable springs 58 might be provided for returning the trip levers 55 to original position after each actuation thereof, and suitable means C may be provided upon each end of the main frame B for engagement with the check wire 57 to maintain the same in proper coöperative relation to the trip levers 55.

The multiple row corn planter will be drawn back and forth across the field in the usual manner, the check wire 57 being alternately placed in engagement with the guide means C at the opposite ends of the main frame. The independent runners B are free to vibrate up and down so as to accommodate themselves to inequalities in the surface of the ground, thereby enabling the planter to be successfully employed upon a field where the surface of the soil is very uneven. As the machine is advanced across the field the trip lever 55 will be actuated by the knots 56 of the check wire 57 so as to produce successive actuations of the rock shaft 12. As previously explained, motion is imparted from this rock shaft through the several crank arms 47 and links 46 to the operating levers 45 of the respective dropping mechanisms so that the seed is dropped into the furrows formed by the runners B at proper intervals.

Having thus described the invention, what I claim as new and desire to secure by Letters Patent, is:—

1. A corn planter, including a main frame, a runner, means for mounting the runner upon the main frame so that it is free to move up and down, comprising a pair of parallel link members pivotally connected at opposite ends to the runner and the main frame so as to maintain the runner in an upright position as it moves up and down, and a seed dropping mechanism mounted upon the runner.

2. A corn planter including a main frame, a runner, a crank shaft carried by the runner, guides upon the main frame for engagement with the ends of the crank shaft so that the runner is free to move up and down, means for maintaining the runner in an upright position as it rises and falls, and a seed dropping mechanism for the runner.

3. A corn planter including a main frame, a runner, a crank shaft carried by the runner, guides upon the main frame for loosely engaging the ends of the crank shaft, means for maintaining the runner in an upright position as it swings up and down, a seed-dropping mechanism for the runner, means coöperating with the crank shaft to hold the runner in a yielding engagement with the soil, and means for rotating the crank shaft to lift the runner into inoperative position.

4. A corn planter including a main frame, a runner, spaced and parallel swinging link members connecting the runner to the main frame so that the runner is free to swing up and down and always maintains an upright position, a crank shaft carried by the runner, guides upon the main frame slidably receiving the ends of the crank shaft, and means acting upon the crank shaft for holding the runner in a yielding engagement with the soil.

5. A corn planter including a main frame, a runner, a seed dropping mechanism for the runner, a crank shaft carried by the runner, horizontal guides upon the main frame slidably engaging the ends of the crank shaft, a pair of superposed and parallel swinging link members connecting the runner to the main frame so that the runner is free to swing up and down and always maintain an upright position, yielding means acting upon the crank shaft to hold the runner in a proper engagement with the soil, and means for rotating the crank shaft to swing the runner upwardly into inoperative position.

6. A corn planter including a main frame, a runner, a seed dropping mechanism for the runner, an operating lever for the seed dropping mechanism, a pair of spaced and superposed swinging link members connecting the runner with the front of the main frame so that the runner can swing up and down and always maintain an upright position, a rock shaft extending across the front of the main frame and journaled thereon, an operative connection between the rock shaft and the operating lever of the seed dropping mechanism, a check wire engaging trip lever at one end of the main frame, and an operative connection between the said trip lever and the rock shaft.

7. A corn planter including a main frame, a runner, a seed dropping mechanism for the runner, a pair of superposed pivot rods extending transversely across the front of the frame, a pair of spaced and parallel superposed swinging link members connecting the runner to the respective pivot rods at the front of the frame so that the runner is free to swing up and down and always maintain an upright position, a rock shaft extending transversely across the front of the frame and journaled thereon, an operative connection between the said rock shaft and the seed dropping mechanism of the runner, a check wire engaging trip lever at one end of the main frame, and an operative connection between the check wire engaging trip lever and the rock shaft.

8. A corn planter including a main frame, a runner, a seed dropping mechanism for the runner, a crank shaft carried by the runner, horizontal guides upon the main frame slidably receiving the ends of the crank shaft, a pair of superposed pivot rods extending transversely across the front of the main frame, a pair of parallel and superposed swinging link members connecting the runner to the respective pivot rods so that the runner is free to swing up and down and always maintain an upright position, a rock shaft extending transversely across the front of the frame and journaled thereon, an operative connection between the rock shaft and the seed dropping mechanism, a check wire engaging trip lever mounted upon the main frame, and an operative connection between the check wire engaging trip lever and the rock shaft.

9. A corn planter including a main frame, a runner, a dropping mechanism for the runner, a transversely extending crank shaft carried by the runner, horizontal guides upon the main frame for slidably receiving the ends of the crank shaft, a pair of superposed pivot rods extending transversely across the front of the main frame, a pair of parallel and superposed swinging link members connecting the runner to the respective pivot rods so that the runner is free to swing up and down and always maintain in upright position, yielding means acting upon the crank shaft to hold the runner in proper engagement with the soil, means for rotating the crank shaft to swing the runner upwardly into inoperative position, a rock shaft extending transversely across the front of the main frame and journaled thereon, an operative connection between the rock shaft and the seed dropping mechanism, a check wire engaging trip lever mounted upon the main frame, and an operative connection between the said trip lever and the rock shaft.

10. A corn planter including a main frame, a runner, a seed dropping mechanism for the runner, a transversely extending crank shaft carried by the runner, horizontal guides upon the main frame slidably receiving the ends of the crank shaft so that the runner is free to move up and down, means for maintaining the runner in an upright position as it moves up and down, a transversely extending main shaft journaled upon the frame, a crank arm projecting from the main shaft, a link member connected to the crank shaft and having a sliding engagement with the corresponding crank arm of the main shaft, said link member being provided with a shoulder, and means for rotating the main shaft to bring the crank arm thereof into engagement with the shoulder of the link member to lift the runner into inoperative position.

11. A corn planter including a main frame, a runner, a dropping mechanism for the runner, a transversely extending crank shaft journaled upon the runner, horizontally disposed guide slots provided upon the main frame for slidably engaging the ends of the crank shaft, a pair of superposed pivot rods extending transversely across the front of the main frame, a pair of parallel and superposed swinging link members connecting the runner to the respective pivot rods whereby the runner is free to swing up and downwardly and always maintain an upright position, a main shaft extending transversely across the rear end of the frame and journaled thereon, an operative connection between the main shaft and the crank shaft for rotating the same to lift the runner into inoperative position, a rock shaft extending transversely across the front of the frame, an arm projecting from the rock shaft, a link connecting the arm to the seed dropping mechanism of the runner, a check wire engaging trip lever mounted upon an end of the main frame, and operative connections between the said check wire engaging trip lever and the rock shaft.

12. A corn planter including a main frame, a runner, a dropping mechanism for the runner, a transversely extending crank shaft journaled upon the runner, horizontally disposed guideways upon the main frame for slidably engaging the ends of the crank shaft, parallel and superposed swinging link members pivotally connecting the runner to the front of the main frame so that the runner is free to swing up and down and always maintain an upright position, an arm projecting from the crank shaft, a spring connected to the arm and normally tending to rotate the crank shaft to move the runner downwardly into a yielding engagement with the soil, and means for rotating the crank shaft to move the runner upwardly into inoperative position.

13. A corn planter including a main frame, a runner, a dropping mechanism for the runner, a transversely extending crank shaft carried by and journaled upon the runner, horizontally disposed guideways arranged upon the main frame for a sliding engagement with the ends of the crank shaft, parallel and superposed swinging link members connecting the runner to the front of the main frame so that the runner is free to swing up and down and always maintain an upright position, means acting upon the rock shaft for normally swinging the runner downwardly into a yielding engagement with the earth, an arm projecting from the rock shaft, a main shaft extending transversely across the frame and journaled thereon, an arm projecting from the main shaft, a link connected to the arm of the crank shaft and slidably engaging the arm of the main shaft, said link being provided with a shoulder, and means for rotating the main shaft to bring the arm thereof into engagement with the shoulder of the link to rotate the crank shaft and lift the runner into inoperative position.

14. A corn planter including a main frame, a runner, a dropping mechanism for the runner, a transversely disposed crank shaft journaled upon the runner, horizontal guideways upon the main frame for slidably engaging the ends of the crank shaft, superposed pivot rods extending transversely across the front of the main frame, a pair of parallel and superposed swinging link members connecting the runner to the corresponding pivot rods so that the runner is free to swing up and down and always maintain an upright position, a pair of arms projecting from the crank shaft, a spring engaging one of the arms of the crank shaft, said spring serving to swing the runner downwardly and normally hold it in a yielding engagement with the earth, and means engaging the opposite arm of the crank shaft for rotating the crank shaft to swing the runner upwardly into inoperative position.

15. A corn planter including a main frame, a runner, a dropping mechanism for the runner, a transversely extending crank shaft carried by the runner and journaled thereon, horizontally disposed guideways applied to the main frame and slidably receiving the ends of the crank shaft, superposed pivot rods extending transversely across the front of the main frame, a pair of parallel and superposed swinging link members connecting the runner to the respective pivot rods so that the runner is free to swing up and down and always maintain an upright position, arms projecting in opposite directions from the crank shaft, a spring connected to one of the arms of the crank shaft, said spring normally tending to swing the runner downwardly into a yielding engagement with the soil, a main shaft extending transversely across the main frame and journaled thereon, an arm projecting from the main shaft, a link connecting the arm of the main shaft to the second arm of the crank shaft, and means for rotating the main shaft to swing the runner upwardly into inoperative position.

In testimony whereof I affix my signature in presence of two witnesses.

ERNEST W. PAULSON.

Witnesses:
NATALIE TAYLOR,
L. S. STOLL.